Patented Jan. 22, 1929.

1,700,056

UNITED STATES PATENT OFFICE.

JOSEPH HIDY JAMES, OF PITTSBURGH, PENNSYLVANIA, ASSIGNOR TO CLARENCE P. BYRNES, TRUSTEE OF SEWICKLEY, PENNSYLVANIA.

GREASE AND METHOD OF PREPARING THE SAME.

No Drawing.   Application filed November 12, 1920. Serial No. 423,557.

My invention relates to the manufacture of greases or heavier types of lubricants. The invention is designed to provide a new type of lubricant of this class, and also a cheap and simple method of making the same.

In preparing such lubricants, I employ the liquid partial oxidation products obtained by treating mineral oil or its fraction by a partial oxidation method with the use of a catalyst. In such method, the mineral oil or its fraction is vaporized, mixed with oxygen, preferably in the form of air, and passed through a catalytic screen under regulated temperatures to give partial oxidation or partial combustion. The catalyst may consist of molybdenum or vanadium oxides or a number of other oxides or compounds, such as set forth in my copending applications Serial No. 272,567, filed January 22, 1919, and Serial No. 435,355, filed January 6, 1921. Under proper regulation of temperatures, etc., a liquid product is obtained containing oxidation products ranging from aliphatic alcohols through aliphatic aldehydes to and including aldehyde fatty acids. The process is preferably so regulated as to give a large proportion of aldehyde fatty acids. The mixture produced, however, contains aldehydes, alcohols and acid anhydrides. The presence of these congeneric substances increases the value of the product in the manufacture of lubricants, as I have demonstrated that they function in lubricating mixtures in the same manner as the fats and fatty oils of the older processes.

In my patent application, Serial No. 395,941, filed July 13, 1920, I have disclosed methods for the preparation of lubricants of various consistencies from these partial oxidation products. In the present application, I will describe my improved methods for the special preparation of greases using these same partial oxidation products as the raw material.

Greases are colloidal systems involving two, three or more components. These components are usually soaps incorporated with animal or vegetable oils, or with these oils together with mineral oils. Water is often a component where the greases are compounded for particular purposes, such, for example, as gear lubrication. The soaps used as the base for such greases in the older processes are the lime salts or the soda salts of the common fatty acids, (or both of them).

In my preparation of greases, my partial oxidation products gives a series of compounds including the soaps, which, in themselves, function completely in the same manner as the mixture of soaps and mineral oils of the older technology. Of course, blends of my greases may be made when desired, but the important point I wish to make here is that in my partial oxidation mixtures, I find that I have all the materials assembled ready for grease manufacture by such simple steps as hereinafter described.

*Procedure A.*

Using preferably the liquid partial oxidation mixture derived from my multiple screen method, the liquid reaction product mixture containing the compounds recited above may be used directly for lime saponification with water. I have found that it is preferable in dissolving the alkali to use the water from the absorbers of the partial oxidation apparatus. This water contains organic acid of low molecular weight which will react at once with the calcium hydroxide used to form low molecular weight soaps. Such soaps will rapidly bring the whole mass of oil and water solution into an emulsion wherein the saponification of the heavier oxidation products proceeds more rapidly than it would where ordinary water is used.

The saponification of the aldehyde acids and anhydrides takes place rapidly with milk of lime to the point of elimination of all free acids and the formation of a grease in the saponification kettle, under the heating carried out in the usual manner. By varying the amount of water, the amount of lime and duration of the boil, etc., I can control the consistency of the grease produced through a wide range making various products, if desired, from the same petroleum fraction. These methods merely cause differences in the relative proportions of soap, non-saponified oil and water. It is possible to control these factors so as to form a grease from which excess water and oil is removed or to form a grease having excess oil only or excess water only. It is also possible to balance these factors so that the whole batch is transformed into a grease of high value. The consistency of the grease can also be varied by changing the particular petroleum fraction subjected to the present oxidation method, the higher boiling point of the fractions making stiffer greases.

I prefer to remove some of the compounds present in the original partial oxidation product and which have a pungent or unpleasant odor, by blowing air through the mixture either before or during saponification. This blowing should be continued for two or three hours or until the odors are removed. If this is carried out during saponification, this also aids in agitating the mixture, which hastens the saponifying action.

Procedure B.

The first procedure is carried out at a temperature no higher than the boiling point of water. After saponifying, the grease batch is carefully heated further to remove all the water and the heating continued slowly for a period and to a temperature dependent upon the consistency desired. In general, a short period of heat at a lower temperature gives a grease of greater fluidity, while a long heating at a higher temperature, gives a stiffer grease. I have found that these mixtures can be heated to as high as 200° C. to advantage. Such greases differ in character from those of Procedure A, in that there is a greater amount of lime soap dissolved in the oil, due to the fact that the mixture is raised to a higher temperature. I may vary this procedure in special cases by separating the lime soap from the rest of the mixture and dissolving it in an oil. This oil may be the non-saponifiable oil from my partial combustion mixture, or may be a straight hydrocarbon mineral or any other oil. I have found that the non-saponifiable oil which is rich in oxidized products, formed as part of my process, is preferable for this purpose.

Procedure C.

In this case, the greases are made in a manner analogous to the lime greases above mentioned, using caustic soda, carbonate of soda or bicarbonate of soda in water solution for the saponification. Here again, it is advisable to use the low molecular weight acids, referred to above, which react at once with the alkali, making low molecular weight soaps which hasten the emulsification. Owing to the different behavior of the soda soaps, the procedure is somewhat changed from that followed in the lime soap grease methods recited above. I prefer in most cases to draw off the supernatant oil which remains after a soda boil and salt out the soap in the soda solution. The top layer is a soda soap grease with water and will serve as a lubricant for certain uses.

Procedure D.

By taking the above soda soap grease with water and carefully heating to remove all the water, it is possible by further heating the remaining soda soap oil system to incorporate more oils, thus making greases of varying consistency, depending on the relative amounts of the components. Any oil may be added to this step, but I prefer the non-saponifiable oil from the soap process itself. I have indicated above that these partially oxidized bodies have lubricating properties analogous to that possessed by the fatty oils, and hence, I prefer to employ them in place of the fatty oils.

By suitable balancing of the proportions of soda, soap and oil, preferably partially oxidized oil, I can very easily prepare the so-called water soluble oils which have a wide use in certain fields of lubrication and in laying dust.

The advantages of my invention result from the new type of cheap and effective lubricant greases which I have developed, as well as from the cheapness and simplicity of the methods of preparing them and the cheapness of the materials from which they are made.

I claim:

1. As a new article of manufacture, a grease containing a material percentage of a soap of a mineral oil oxygenated organic acid.

2. As a new article of manufacture, a grease containing a material percentage of a soap of a mineral oil oxygenated organic acid, and oil.

3. As a new article of manufacture, a grease containing a material percentage of a soap of a mineral oil oxygenated organic acid, oil and water.

4. As a new article of manufacture, a grease containing a material percentage of a soap of an oxygenated organic acid, non-saponified oil and water.

5. As a new article of manufacture, a grease containing a material percentage of a soap of an oxygenated organic acid, and a partial oxidation non-saponified oil.

6. As a new article of manufacture, a grease containing a material percentage of a soap formed from the mixture of oxygenated organic acids resulting from a gaseous-phase partial-oxidation of hydrocarbons.

7. As a new article of manufacture, a grease containing a material percentage of a soap of mineral oil oxygenated organic acids and anhydrides.

8. As a new article of manufacture, an emulsion containing a soap of oxygenated organic acids.

9. As a new article of manufacture, a grease containing a material percentage of the soaps formed by saponifying a previously formed mixture of oxygenated organic acids.

10. In the manufacture of greases, the step consisting of saponifying the oxygenated organic acids resulting from gaseous-phase partial-oxidation of hydrocarbons.

11. In the manufacture of greases, the step consisting of saponifying a previously formed mixture containing mineral oil oxygenated organic acids and acid anhydrides.

12. In the manufacture of greases, the step consisting of saponifying the oxygenated organic acids resulting from gaseous-phase partial-oxidation of hydrocarbons, and then purifying the same to lessen the aldehydic odors.

13. As a new article of manufacture, a grease containing a material percentage of a salt of an oxygenated organic acid derived from mineral oil.

14. As a new article of manufacture, a grease comprising an emulsion containing a material percentage of a salt of an oxygenated organic acid derived from mineral oil.

15. As a new article of manufacture, grease containing a material percentage of the soaps formed by saponifying a mixture of oxygenated organic acids of different molecular weights.

16. In the manufacture of greases, the steps consisting of partially oxidizing a mineral oil in the gaseous phase, condensing a part of the products, and then saponifying a part of the condensed liquid mixture.

In testimony whereof, I have hereunto set my hand.

JOSEPH HIDY JAMES.

CERTIFICATE OF CORRECTION.

Patent No. 1,700,056.            Granted January 22, 1929, to

JOSEPH HIDY JAMES.

It is hereby certified that error appears in the printed specification of the above numbered patent requiring correction as follows: Page 2, line 121, claim 5, for the compound word "non-saponified" read "non-saponifiable"; and that the said Letters Patent should be read with this correction therein that the same may conform to the record of the case in the Patent Office.

Signed and sealed this 19th day of February, A. D. 1929.

M. J. Moore,
Acting Commissioner of Patents.

(Seal)

8. As a new article of manufacture, an emulsion containing a soap of oxygenated organic acids.

9. As a new article of manufacture, a grease containing a material percentage of the soaps formed by saponifying a previously formed mixture of oxygenated organic acids.

10. In the manufacture of greases, the step consisting of saponifying the oxygenated organic acids resulting from gaseous-phase partial-oxidation of hydrocarbons.

11. In the manufacture of greases, the step consisting of saponifying a previously formed mixture containing mineral oil oxygenated organic acids and acid anhydrides.

12. In the manufacture of greases, the step consisting of saponifying the oxygenated organic acids resulting from gaseous-phase partial-oxidation of hydrocarbons, and then purifying the same to lessen the aldehydic odors.

13. As a new article of manufacture, a grease containing a material percentage of a salt of an oxygenated organic acid derived from mineral oil.

14. As a new article of manufacture, a grease comprising an emulsion containing a material percentage of a salt of an oxygenated organic acid derived from mineral oil.

15. As a new article of manufacture, grease containing a material percentage of the soaps formed by saponifying a mixture of oxygenated organic acids of different molecular weights.

16. In the manufacture of greases, the steps consisting of partially oxidizing a mineral oil in the gaseous phase, condensing a part of the products, and then saponifying a part of the condensed liquid mixture.

In testimony whereof, I have hereunto set my hand.

JOSEPH HIDY JAMES.

CERTIFICATE OF CORRECTION.

Patent No. 1,700,056.                            Granted January 22, 1929, to

JOSEPH HIDY JAMES.

It is hereby certified that error appears in the printed specification of the above numbered patent requiring correction as follows: Page 2, line 121, claim 5, for the compound word "non-saponified" read "non-saponifiable"; and that the said Letters Patent should be read with this correction therein that the same may conform to the record of the case in the Patent Office.

Signed and sealed this 19th day of February, A. D. 1929.

M. J. Moore,
Acting Commissioner of Patents.

(Seal)